United States Patent [19]

Chen et al.

[11] Patent Number: 5,396,583
[45] Date of Patent: Mar. 7, 1995

[54] CYLINDRICAL TO PLANAR IMAGE MAPPING USING SCANLINE COHERENCE

[75] Inventors: Shenchang E. Chen, Sunnyvale; Gavin S. P. Miller, Mountain View, both of Calif.

[73] Assignee: Apple Computer, Inc., Cupertino, Calif.

[21] Appl. No.: 959,716

[22] Filed: Oct. 13, 1992

[51] Int. Cl.$^6$ ............................................. G06F 15/62
[52] U.S. Cl. .................................................. 395/127
[58] Field of Search ............... 395/127, 129, 130, 125, 395/126; 345/19, 126

[56] References Cited

U.S. PATENT DOCUMENTS

| | | | |
|---|---|---|---|
| 4,736,436 | 4/1988 | Yasukawa et al. | 382/16 |
| 4,752,836 | 6/1988 | Blanton et al. | 358/342 |
| 4,807,158 | 2/1989 | Blanton et al. | 395/125 |
| 4,821,212 | 4/1989 | Heartz | 395/125 |
| 4,841,292 | 6/1989 | Zeno | 340/736 |
| 4,899,293 | 2/1990 | Dawson et al. | 395/125 |
| 4,935,879 | 6/1990 | Ueda | 395/130 |
| 4,972,319 | 11/1990 | Delorme | 434/150 |
| 4,998,212 | 3/1991 | Dedieu et al. | 395/135 |
| 5,019,809 | 5/1991 | Chen | 340/815.31 |
| 5,051,734 | 9/1991 | Lake, Jr. | 345/190 |
| 5,161,013 | 11/1992 | Rylander et al. | 358/160 |
| 5,175,808 | 12/1992 | Sayre | 395/125 |
| 5,179,638 | 1/1993 | Dawson et al. | 395/125 |
| 5,204,944 | 4/1993 | Wolberg et al. | 395/119 |
| 5,224,208 | 6/1993 | Miller, Jr. et al. | 395/125 |

OTHER PUBLICATIONS

Williams, Lance, "Pyramidal Parametrics," Computer Graphics, vol. 17, No. 3, Jul. 1983 pp. 1-11.
Greene, Ned, "Environment Mapping and Other Applications of World Projections," IEEE Computer Graphics and Applications, vol. 6, No. 11, Nov. 1986, pp. 21-29.
Gardner, Geoffrey Y., "Simulation of Natural Scenes Using Textured Quadric Surfaces," Computer Graphics, vol. 18, No. 3, Jul. 1984, pp. 11-20.
Perlin, Ken, "An Image Synthesizer," Computer Graphics, vol. 19, No. 3, 1985 pp. 287-296.
Foley, James D. et al., Computer Graphics: Principles and Practice, 2nd ed., 1990, pp. 91, 657, 680, 715, 1156.

*Primary Examiner*—Mark K. Zimmerman
*Assistant Examiner*—Mike Smith
*Attorney, Agent, or Firm*—Blakely, Sokoloff, Taylor & Zafman

[57] ABSTRACT

A method and apparatus for generating perspective views of a scene. With a viewing position at the center of a cylindrical environment map, different views can be obtained by rotating the viewing direction either horizontally or vertically. The horizontal construction method of the present invention generally involves the steps of: determining the portion of the cylindrical map to be viewed; vertically interpolating pixel values in the portion of the cylindrical map to be viewed and mapping to a viewing plane; and displaying the viewing plane. The vertical construction method of the present invention generally involves the steps of: determining the portion of the cylindrical map to be viewed; vertically interpolating pixel values in the portion of the cylindrical map to be viewed and mapping to a vertical plane; horizontally interpolating pixel values in the vertical plane and mapping to the viewing plane; and displaying the viewing plane.

17 Claims, 8 Drawing Sheets

CYLINDRICAL TO PLANAR IMAGE MAPPING USING SCANLINE COHERENCE

BACKGROUND OF THE INVENTION

1. Field of the Invention

The present invention relates to the field of image construction, in particular to the field of constructing perspective views from a given image.

2. Description of the Related Art

In the computer related field of virtual reality, it is desirable to obtain different views of a scene rapidly and with freedom to choose any viewing direction. It is known in the art to use an environment map to create different views of a scene. An environment map is an image or collection of images which characterize the appearance of a scene when viewed from a particular position. By mapping the environment map to a desired viewing plane, different perspective views may be obtained. This is a process termed rendering the environment map. A variety of different forms of environment maps have been used in the past. Each type of environment map has an associated projection which is used to compute the appearance along a ray traveling in a particular direction towards the camera. Not all types of environment maps capture the scene in every direction.

Creation of an environment map may be done through the use of computer graphics techniques, or by the digitizing of a photographic image(s). In either case, the environment map will have properties that are exploited when creating the perspective views.

An orthographic projection of a reflecting sphere to characterize the illumination of a scene is described by Williams in "Pyramidal Parametrics", *Computer Graphics*, Vol. 17, No. 3, pgs. 1-11, July, 1983. The intention was to use this environment map as an aid to the rapid computation of specular reflections. In an article by Greene entitled "Environment Mapping and Other Applications of World Projections", *IEEE Computer Graphics and Applications*, Vol. 6, No. 11, pgs. 21-29, Nov., 1986, six images on the faces of a cube are used for a "cubic environment map". This mapping was used to resample synthetic images of a scene to be redisplayed in the form of an Omnimax wide angle lens projection system as well as for the computation of reflections.

A third type of environment maps are termed spherical environment maps. There are a number of types of spherical projection which may be used to store spherical environment maps. Two are of particular interest; spherical reflection maps, and parametric spherical maps.

Spherical reflection maps store an image of the environment as an orthographic projection of a sphere shaded with a perfect reflection of the surrounding scene. Typically, these maps are circular images of spheres within a square array of pixels. These maps are useful for the computation of reflections and illumination when rendering specular surfaces. They do, in fact, sample the entire orientation space. However, they have the disadvantage that the orientations near the silhouette of the sphere are very sparsely sampled. This renders them unsuitable as a representation for all-round interactive viewers.

Parametric spherical environment maps store the environment data in a rectangular image where the (x, y) coordinates of a pixel, map linearly to points on a sphere which are defined by the ($\theta$, $\phi$) spherical (or angular) coordinates of a corresponding direction vector.

The relationship between the direction vector and the angular coordinates is given by:

$D_x = \cos(\theta) \sin(\phi)$
$D_y = \cos(\theta) \cos(\phi)$
$D_z = \sin(\theta)$ Typically, a parametric spherical environment map is twice as wide as it is high since a sphere is twice the distance around the equator as it is from pole to pole. All regions are sampled at least as much as at the equator. Regions near the poles are oversampled. The parametric spherical environment map contains the pixel values which are used to display the parametric spherical environment.

Parametric spherical environment maps have a number of useful properties.

The environment is stored in a single contiguous image.

They sample the environment completely.

Translation along the equatorial direction in the map corresponds with rotation about the poles of the sphere.

The environment is always sampled at least as frequently as at the equator.

Means for viewing a spherical environment map may be characterized by the algorithm used for display and by the speed with which different degrees of freedom for the view point may be updated.

KNOWN TECHNIQUES FOR RENDERING SPHERICAL ENVIRONMENT MAPS

A related area to such rendering is termed texture mapping. In texture mapping a texture file (or image) is applied to points on an object being rendered. This is conceptually analogous to putting a decal on a solid object. In any event, rendering spherical environment maps and textured spheres may be done using a number of different known approaches. The most appropriate approach for doing this will depend on the number of degrees of freedom required during an interactive viewing session. In any event, when rendering a parametric spherical environment map, one may consider the environment to be a texture on the surface of a sphere in 3-D space. A viewpoint with respect to the sphere will determine what is seen by the viewer. For example, the viewpoint may be outside the sphere looking at it as a whole, or it may be a perspective view from within the sphere.

Direct Scan-Conversion

For the general perspective case, i.e. unrestricted directions of manipulation, one approach is to compute the analytic form of the intersection between a plane (formed by the viewpoint and a scanline) and the sphere. In an article entitled "Simulation of Natural Scenes Using Textured Quadric Surfaces", *Computer Graphics*, Geoffrey Y. Gardner, Vol. 18, No. 3, pgs. 11-20, July, 1984, such a scheme was used for textured ellipsoids. Because the surface texture was a procedural texture which only depended on the surface (x, y, z) point, the (u, v) parameters for the surface were not required. The additional computational requirements for the (u, v) values make this general approach suitable for a non-real time system, but prohibitive for real-time use on personal computers without special rendering hardware. Such special hardware may significantly increase the cost of the computer system.

Texture Map Indirection

An alternative approach is to restrict the degrees of freedom with which the viewer may manipulate the sphere. If the sphere is in a fixed position, with a fixed size, a technique called texture map indirection may be used. The sphere is first rendered into a look-up-table, which is the same size as the final image. This is known as the screen look-up-table. Each look-up-table pixel contains the surface (u, v) value for the rendered sphere.

The "u" index is along the equator; while the "v" index is between the poles. When computing the final image, the contents of the screen look-up-table are used to index into the parametric spherical environment map. If this is done directly, this process would always obtain the same image of the sphere. However, if the sphere u index is offset before being used to look up the texture value, the spherical texture appears to rotate about an axis passing through the poles. This has the effect of allowing a single rotational degree of freedom for the textured sphere or spherical environment. This technique is similar to that described in an article entitled "An Image Synthesizer", Ken Periin, *Computer Graphics*, Vol. 19, No. 3, pgs. 287–296, 1985. In the article, the shading is being changed for a fixed geometric scene.

A third approach to rendering spherical environment maps is described in co-pending application Ser. No. 07/880,240 entitled "Textured Sphere and Spherical Environment Map Rendering Using Texture Map Double Indirection", which is assigned to the assignee of the present application. In this approach, two axes of rotation are provided for creating different views.

As is apparent from above, the rendering of a spherical environment map can be quite complex and require either large look-up tables or significant amounts of computational power. Although the spherical environment map has many desirable properties, many are not needed in some virtual reality type applications. For example, it may not be necessary to have an unrestricted field of view in the vertical direction. Further, other rendering functions, such as anti-aliasing require additional computational power.

Thus, it is an object of the present invention to provide an environment map and accompanying rendering technique that minimizes computational requirements and size of any requisite look-up tables. It is a further object of the present invention to minimize the computation required for reducing aliasing effects.

SUMMARY

A method and apparatus for generating perspective views of a scene, is disclosed. With a viewing position at the center of a cylindrical environment map, different views may be obtained by rotating the viewing direction either horizontally or vertically. A horizontal rotation will cause panning of the scene from "side to side". A vertical rotation will cause the view to go "up or down". The cylindrical environment map may cover up to 360 degrees in the horizontal direction and less than 180 degrees in the vertical direction (typically 50 degrees). A cylindrical environment map provides image data with coherent properties. These coherent properties are exploited so that perspective views may be generated quickly and accurately while minimizing computations requirements and look-up table sizes.

The generation of a view resulting from horizontal rotation generally involves the steps of: determining the portion of the cylindrical map to be viewed; interpolating pixel values vertically in the portion of the cylindrical map to be viewed and mapping to a viewing plane; and displaying the viewing plane. The generation of a view resulting from vertical rotation generally involves the steps of: determining the portion of the cylindrical map to be viewed;interpolating pixel values vertically in the portion of the cylindrical map to be viewed and mapping to a vertical plane; interpolating pixel values horizontally in the vertical plane and mapping to the viewing plane; and displaying the viewing plane.

DETAILED DESCRIPTION OF THE PREFERRED EMBODIMENT

A method and apparatus for generating perspective scenes from a cylindrical environment map, is described. In the following description, numerous specific details are set forth in order to provide a thorough understanding of the present invention. It will be apparent, however, to one skilled in the art that the present invention may be practiced without such specific details. In other instances, specific implementation details, such as table data structures, have not been shown in detail in order not to unnecessarily obscure the present invention.

OVERVIEW OF A COMPUTER SYSTEM IN THE PREFERRED EMBODIMENT

Figure 1:
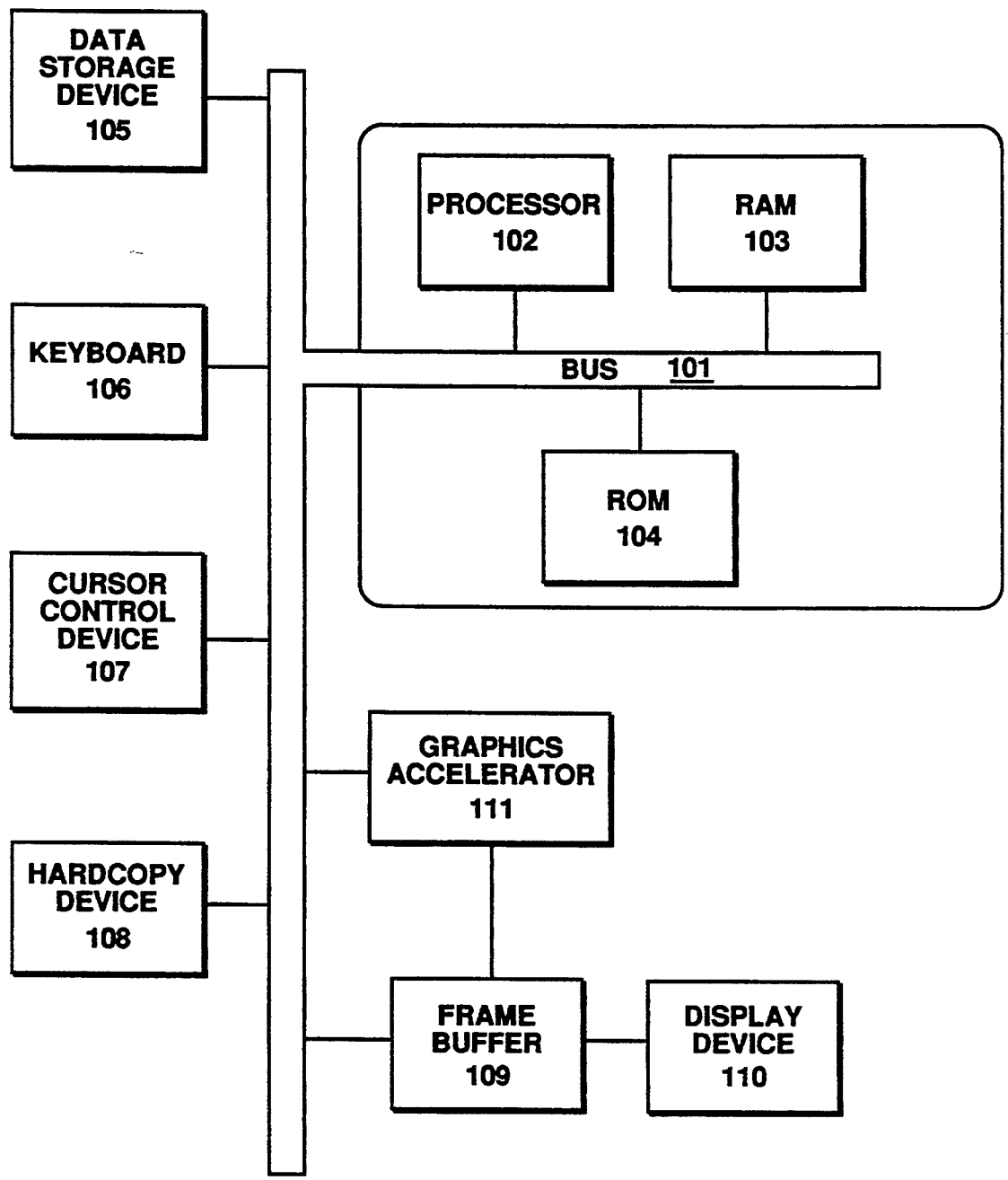
FIG. 1 is a block diagram of a computer system as may be utilized by the preferred embodiment of the present invention.

The computer system of the preferred embodiment is described with reference to FIG. 1. The present invention may be implemented on a general purpose microcomputer, such as one of the members of the Apple ® Macintosh ® family, one of the members of the IBM Personal Computer family, or one of several work-station or graphics computer devices which are presently commercially available. In any event, a computer system as may be utilized by the preferred embodiment generally comprises a bus or other communication means 101 for communicating information, a processor means 102 coupled with said bus 101 for processing information, a random access memory (RAM) or other storage device 103 (commonly referred to as a main memory) coupled with said bus 101 for storing information and instructions for said processor 102, a read only memory (ROM) or other static storage device 104 coupled with said bus 101 for storing static information and instructions for said processor 102, a data storage device 105, such as a magnetic disk and disk drive, coupled with said bus 101 for storing information and instructions, an alphanumeric input device 106 including alphanumeric and other keys coupled to said bus 101 for communicating information and command selections to said processor 102, a cursor control device 107, such as a mouse, track-ball, cursor control keys, etc, coupled to said bus 101 for communicating information and command selections to said processor 102 and for controlling cursor movement. Additionally, it is useful if the system includes a hardcopy device 108, such as a printer, for providing permanent copies of information. The hardcopy device 108 is coupled with the processor 102 through bus 101.

Also coupled to the computer system of the preferred embodiment is a frame buffer 109 which is further coupled to a display device 110, preferably a display device capable of displaying color graphics images or high resolution monochrome graphical images. The frame buffer 109 contains the pixel data for driving the display device 110. In some implementations, the display device 110 may be optionally coupled to a rendering device 111, also known as a graphics accelerator. Typically, such a rendering device 111 is coupled to the bus 101 for communication with the processor 102 and frame buffer 109. The preferred embodiment is implemented for use on Macintosh ® family of computers available from Apple ® Computer, Inc. of Cupertino, Calif.

It should be noted that the processor 102 performs various parts of the rendering method, such as table creation and table look-ups. Further, such created tables and other data may be stored in RAM 103 (for data that is dynamic in nature), or in data storage device 105 or ROM 104 (for data that is static in nature).

Finally, it should be noted that an alternative embodiment of the present invention may be practiced on a system of fixed functionality. For example, it would be apparent to one skilled in the art to provide a fixed set of screen look-up tables stored in ROM, wherein perspectives views are limited. Alternatively, a graphics accelerator, as described above, may be designed which embodies the present invention.

What will now be described is the cylindrical environment map and the techniques for rendering portions therein.

Cylindrical Environment Map

A cylindrical environment map stores an image of the environment as a projection onto a cylinder from a point in the middle of the cylinder. Typically, this image covers a 360-degree field-of-view around the center axis of the cylinder and a more limited field-of-view vertically. A view point is fixed on the center axis and at the vertical middle. Thus, all views of the cylindrical environment would be from this perspective view point. It would be apparent to one skilled in the art to provide for shifting the view point. Such an implementation would nor depart from the spirit and scope of the present invention.

The cylindrical environment map allows very efficient view rotation in one direction-around the center axis of the cylinder. Such rotation is termed a horizontal rotation. This is because the transformation from the cylinder to a viewing plane is a uniform scaling of vertical scanline data. This process is termed vertical scaling. As will be described in greater detail below, vertical rotation may be performed very quickly using a two-step approach. In the first step, the cylinder is mapped to a vertical plane (in a similar manner to the vertical scaling described above). In the second step, the vertical plane is mapped to the viewing plane. This mapping is just a uniform scaling of data for each horizontal scanline. The second step is termed horizontal scaling.

Figure 2:
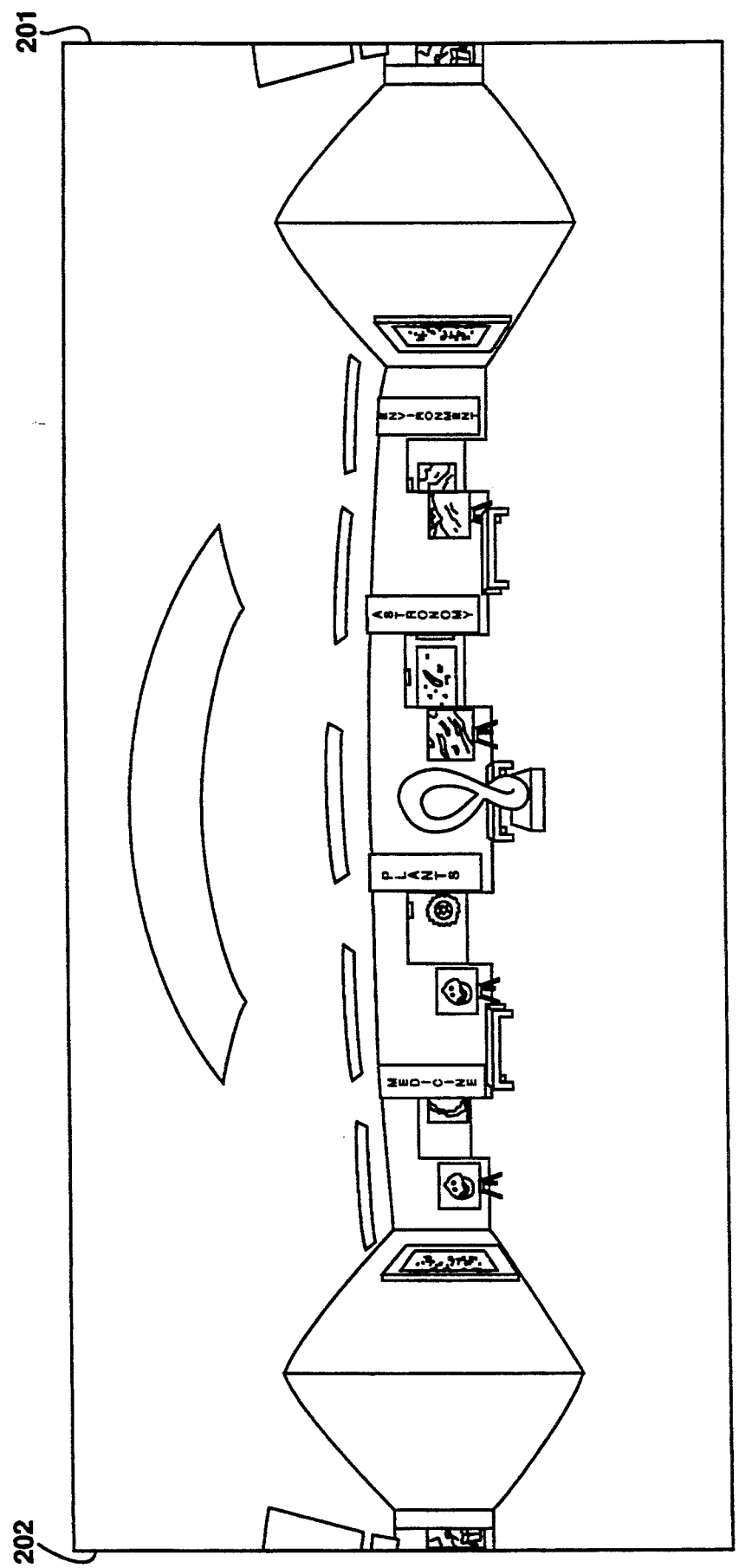
FIG. 2 illustrates a cylindrical environment map as may be used by the preferred embodiment of the present invention.

A cylindrical environment may be created using known computer aided image generation techniques or through the digitizing of panoramic pictures. A panoramic picture may be captured by using a special camera, e.g. the Globuscope 35 Millimeter Camera, available from Globuscope, Inc. of New York, New York. Such a panoramic picture is illustrated in FIG. 2. End sides 201 and 202 may then be thought of as being connected so as to form a cylinder.

Figure 3A:
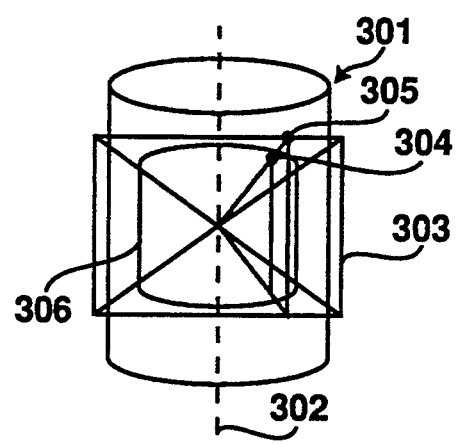
FIG. 3a illustrates the geometry of a cylindrical environment map with respect to a viewing plane as used by the preferred embodiment of the present invention.

The geometry for the cylindrical mapping is illustrated with respect to FIGS. 3a–3d. Referring to FIG. 3a, a cylindrical environment map is represented by cylinder 301. The center axis 302 of the cylinder 301 provides the viewpoint from which views of the scene will be based. Also illustrated are a viewplane 303 and a viewable portion 306. The viewable portion 306 is the part of the cylindrical environment map 301 that will be mapped to the viewplane 303 and subsequently displayed. Finally, a point 304 on the viewable portion 306 is illustrated. During the rendering process, the point 304 will map to the point 305 of the viewing plane. Note that the cylindrical environment map 301 will be addressable by (u,v) coordinate points. These (u,v) coordinate points of the cylindrical environment map will map directly to (x,y) coordinates of the viewing plane. The u-coordinate represents an angular displacement and the v-coordinate represents a vertical displacement for a point on the cylinder.

It should further be noted that the view plane 303 may then be mapped to a display or portion of a display, for viewing. Such a mapping requires scaling and translating the viewplane to the display device coordinate system. Such techniques, for scaling and translating are well known in the field.

Figure 3B:
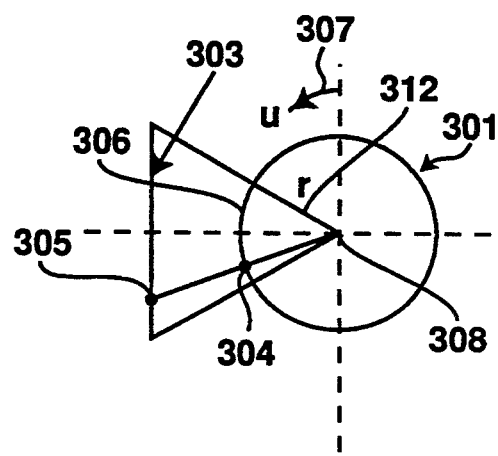
FIG. 3b is a top view of the geometry of the cylindrical environment map with respect to a viewing plane illustrated in FIG. 3a, as used by the preferred embodiment of the present invention.

A top view of the cylindrical environment map geometry of FIG. 3a is illustrated by FIG. 3b. Besides the aformentioned elements in FIG. 3b is the orientation of the u-coordinate 307 of the cylindrical environment map 301. As illustrated, the u-coordinate represents the angular position with respect to an origin 308. Finally, the radius "r" 312 of the cylinder is illustrated. The radius "r" 312 is simply the distance from the center of the cylinder to the surface of the cylinder.

Figure 3C:
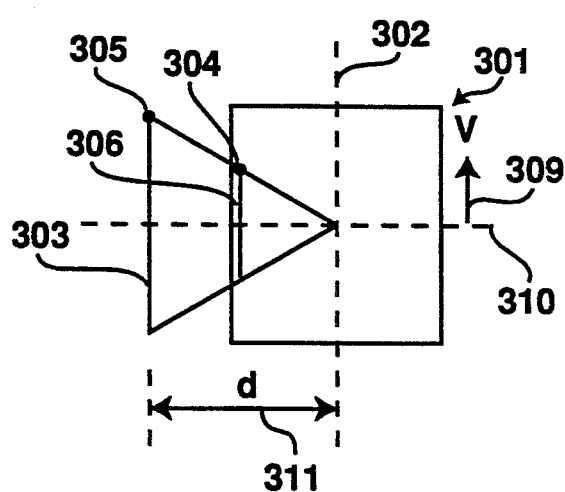
FIG. 3c is a side view of the geometry of the cylindrical environment map with respect to a viewing plane illustrated in FIG. 3a, as used by the preferred embodiment of the present invention.

A side view of the cylindrical environment map geometry of FIG. 3a is illustrated by FIG. 3c. Besides the aformentioned elements, further illustrated in FIG. 3c is the orientation of the v-coordinate 309 of the cylindrical environment map 301. As illustrated, the v-coordinate represents the linear position with respect to middle axis 310. Note that the middle axis 310 bisects the cylinder 301, whereas the center axis 302 is oriented along the center of the cylinder 301. Finally, a distance "d" 311 is illustrated. The distance "d" 311 represents the distance from the center axis 302 to the viewing plane 305. The distance "d" 311 is used in calculating the relationship between points in the viewing plane 303 and the viewable portion 306.

Figure 3D:
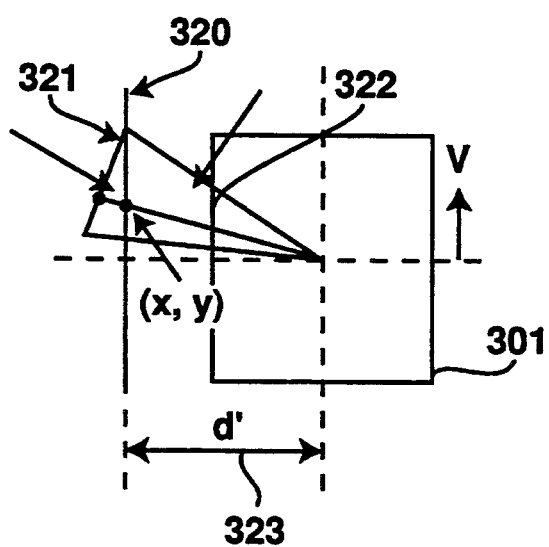
FIG. 3d is a side view of the geometry of a cylindrical environment map for a vertical rotation as may be used by the preferred embodiment of the present invention.

FIG. 3d is a side view which illustrates the cylinder geometry for a vertical rotation. First, a viewable portion 322 is mapped to vertical plane 320. The vertical plane 320 is then mapped to viewing plane 321. Note that the viewing plane 321 is not vertical since it has been rotated vertically with respect to the viewpoint. The first and second mappings for vertical rotation are described in more detail below. Finally, the distance "d" 323 is illustrated. The distance "d" 323 is used in performing the first mapping of viewable portion 322 to vertical plane 320.

The present invention exploits a property of a cylindrical environment map that is termed scanline coherence. By scanline coherence, it is meant that the relationship between the scanlines in the cylindrical environment and these in the view plane have a regular or ordered relationship. Because of this, mappings between portions of the cylindrical environment map and a viewing plane may be performed by simple scaling calculations.

Another advantage of the scanline coherence of the cylindrical environment map is that anti-aliasing is faster with the cylindrical map than with other known environment maps. Since the mapping is simply a uniform scaling of scanlines, we can exploit the scanline coherence to speed up the anti-aliasing.

Horizontal Rotation

Horizontal rotation within the cylindrical environment map causes panning of the scene horizontally. As mentioned above, horizontal rotation is accomplished by a process termed vertical scaling. When rotating the camera around the center axis of the cylinder, the relationship between the screen (x, y) coordinates of each vertical scanline and the texture (u, v) parameters of the cylindrical environment map is given by the following equations:

$$u = \tan^{-1}(x/d)/2\pi$$

$$v = yr \cos(u)/d$$

where r is the radius of the cylinder and d is the distance between the center of the cylinder to the view plane.

This is illustrated with reference to FIGS. 3b and 3c. In FIG. 3b, the radius "r" 312 is illustrated. Recall that the circumference of a cylinder is given by the equation $c = 2\pi r$. Thus, the radius "r" is simply $c/2\pi$. As the circumference is merely the horizontal width of the cylindrical environment map, "c" is known. Thus, "r" is constant and is readily determinable.

The distance "d" 311 is illustrated in FIG. 3c. The distance "d" will change if the view plane 303 is moved. Thus, the distance "d" may change upon the change of view of the environment map. Such a change in the view of the environment map may occur, for example by a zooming-in or zooming-out operation.

Since "r", "u" and "d" (of the above equation) are constant for a given vertical scanline, the mapping from "y" to "v" is a constant scaling which may be achieved using a uniform resampling of the vertical scanline pixels. The scaling factor will be different for each vertical scanline although they are independent of the horizontal rotation angle. In the currently preferred embodiment, in order to avoid calculating these scaling factors for every horizontal rotation, a 1-D look-up-table can be pre-computed to store the mapping. However, omission of the 1-D look-up table would not cause a departure from the spirit and scope of the present invention. In any event, the 1-D table stores the corresponding (u, v) parameters, for the top point of each vertical scanline on the viewing plane. The bottom point of the scanline does not need to be stored because of the symmetry of the cylindrical environment map. The table only needs to be updated when the field-of-view of the camera, the view plane or the dimensions of the cylindrical environment map are changed.

When rotating horizontally, for each vertical screen scanline, the corresponding vertical environment map scanline bounded by (u, v) and (u, -v) is found from the look-up-table. The vertical environment map scanline then is mapped to the viewing plane scanline by a uniform scaling factor. Each vertical scanline has a different scaling factor which has been determined to be the value $r\cos(u)/d$. This is illustrated by FIG. 3c, where point 304 of the cylindrical environment map is mapped to the view plane 303 at point 305.

For computational efficiency, the storage of the cylindrical environment map may be rotated 90 degrees so that the environment map scanlines are oriented horizontally. This rotation makes the vertical scanline pixels contiguous in memory providing for fast sequential access.

Figure 4:
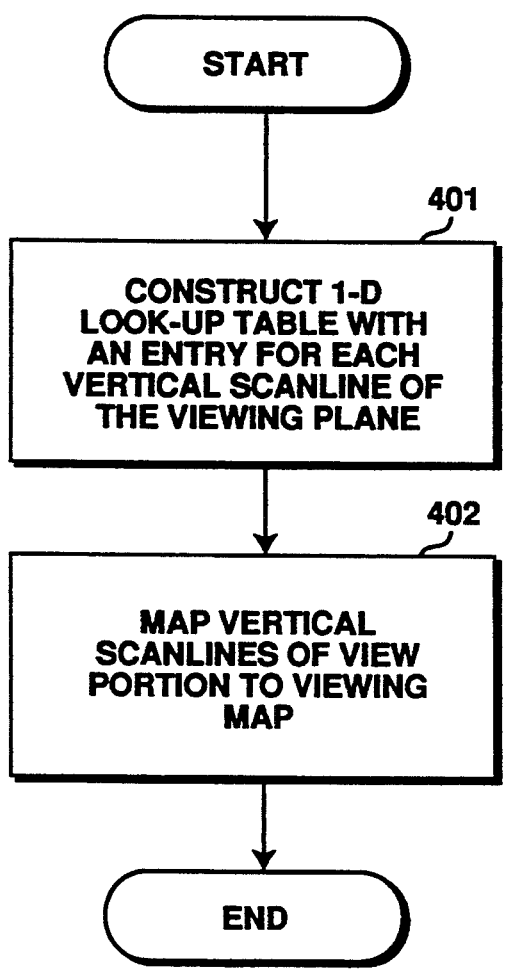
FIG. 4 is a flowchart which describes the steps for horizontal rotation as may be performed by the preferred embodiment of the present invention.
Figure 5:
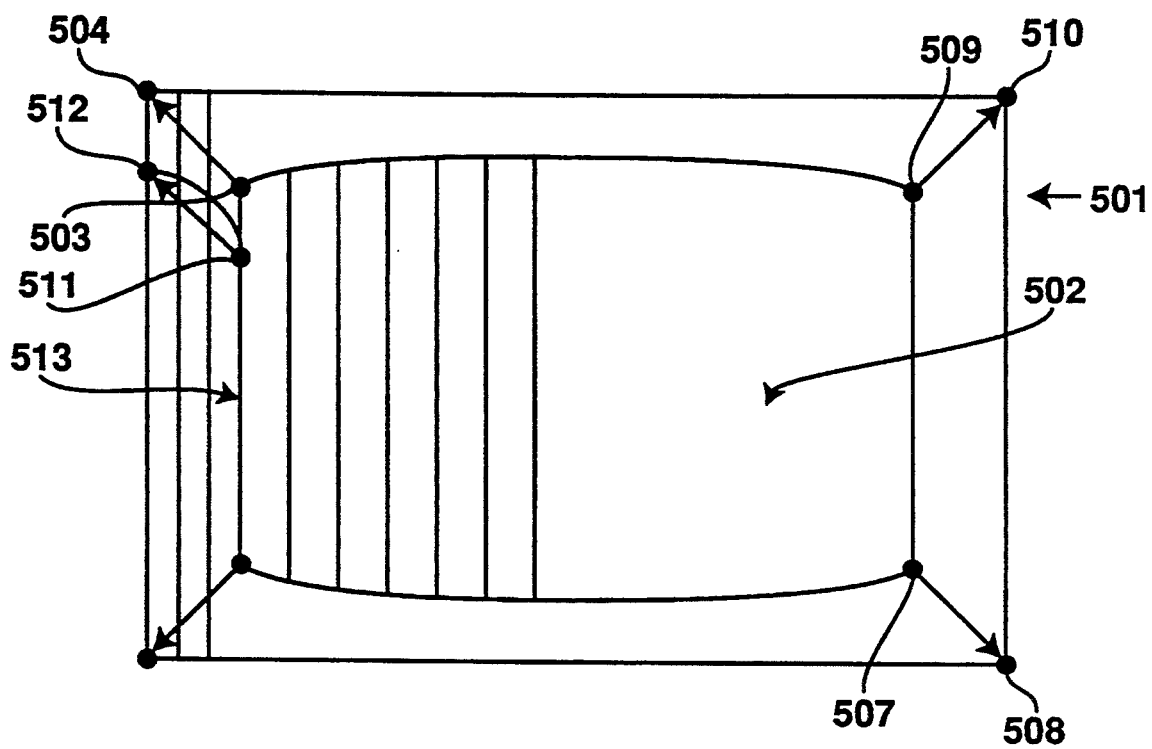
FIG. 5 illustrates vertical scaling as may be performed by the preferred embodiment of the present invention.

FIG. 4 and 5 further illustrate horizontal and vertical scaling as performed in the currently preferred embodiment of the present invention. FIG. 4 is a flowchart outlining the steps of horizontal rotation. First, a 1-D look-up table is constructed for each vertical scanline of the viewing plane. As described above, this 1-D look-up table is used to avoid calculating these scaling factors for every horizontal rotation, step 401. Next, each vertical scanline of the viewable portion of the cylindrical environment map is mapped to the viewing plane, step 402.

FIG. 5 illustrates vertical scaling in more detail. A viewable portion 502 is mapped to viewing plane 501. Each point on a vertical scanline is mapped to a corresponding point on the viewing plane 501. For example, the point 503 of the viewable portion 502 is mapped to point 504 of viewing plane 501. Similarly, a point 511 of the viewable portion 502 is mapped to point 512 of viewing plane 501. Note that since the points 503 and 511 are on the same vertical scanline 513, the "y" will have the same scaling factor, namely $r\cos(u)/d$.

Each of the remaining points on the viewable portion 502 are mapped to the viewing plane 501, e.g. points 507 and 509 of the viewable portion 502 are mapped to the points 508 and 510, respectively, of the viewing plane 501.

Vertical Rotation

Vertical rotation causes the viewing frustum to move up and down. As described above, vertical rotation is achieved in two steps. The first step, mapping from the cylinder to a vertical plane, is similar to that described above with respect to horizontal rotation. The second step, is a mapping of the vertical plane to a viewing plane.

The mapping from the cylinder to the vertical plane is a uniform scaling of the vertical scanlines of the cylindrical environment map as shown in FIG. 3d. As noted above, it is a mapping that is similar in intent to the vertical scaling described with reference to horizontal rotation. However, because of the change in the vertical rotational angle, there are differences. As noted above, a 1-D look-up table may be generated for computational efficiency in performing vertical scaling. Two problems arise; first, the 1-D look-up-table is computed for a particular vertical rotational angle, so it needs to be recomputed every time the vertical rotational angle is changed. Second, when rotated vertically, the scanlines are offset vertically. Because of the offset, the top and bottom projections created by the two end points of a vertical scanline no longer have vertical symmetry. This means that separate look-up-tables would be needed for the top and the bottom mappings.

One approach is that a look-up-table can be pre-computed and stored for every vertical rotational increment. This approach would increase the storage requirements for the look-up-table. However, such an implementation would not depart from the spirit and scope of the present invention.

A more efficient approach takes advantage of the observation that when rotating vertically, the x-coordinates remain constant. This means that the u-parameter is also constant. As described with reference to horizontal rotation, the equation for determining the u-parameter is $$u = \tan^{-1}(x/d)/2\pi.$$

Thus, so long as x and d do not change, the value of u will not change.

It is further observed that the change in the v-parameter is a simple rescaling by the y-coordinate (again because because the other terms remain constant). Therefore, the equation for calculating the v-parameter may be changed to $$v = r \cos(u)/d.$$

Then when rotating vertically, the same look-up-table can be used for all vertical rotation angles. A different scaling factor can be computed by multiplying the y-coordinate with the v-value stored in the look-up table.

In the second step, the mapping is between the vertical plane and a rotated view plane as illustrated in FIG. 3d. This mapping is termed horizontal scaling. The mapping can be computed by a perspective division:

$$x = d'x'/z'$$

$$y = d'y'/z'$$

where x', y' and z' are pixel coordinates on the rotated view plane and d' is the distance from the vertical plane viewing point within the cylinder. The term perspective division is well known to those skilled in the art and refers to a division operation performed for obtaining three-dimensional or perspective views. In any event, because z' is constant for a horizontal scanline, the mapping between a horizontal scanline on the vertical plane to its projection on the view plane is a uniform scaling. Therefore, the division only needs to be performed once per scanline.

The y-increment is non-uniform in the second mapping because z' changes with y' when the view plane is rotated vertically. As a result, the uniformly distributed horizontal scanlines on the viewing plane do not map to those on the vertical plane.

To resolve this, a first approach would be to resemble the scanlines on the vertical plane during the second mapping (i.e. horizontal scaling). However, this would create aliasing artifacts and would require increased computing resources.

An alternative approach is utilized in the currently preferred embodiment. In the alternative approach a look-up-table for the nonuniform vertical increments is computed. The look-up-table is then used in the first mapping, (i.e. during vertical scaling), to decide which horizontal scanlines to create for the vertical plane. This will create non-uniformly distributed scanlines on the vertical plane. But, during the second mapping the scanlines then will map to uniformly distributed scanlines on the viewing plane. In this way, the second mapping is a simple scaling of each horizontal scanline.

Figure 6:
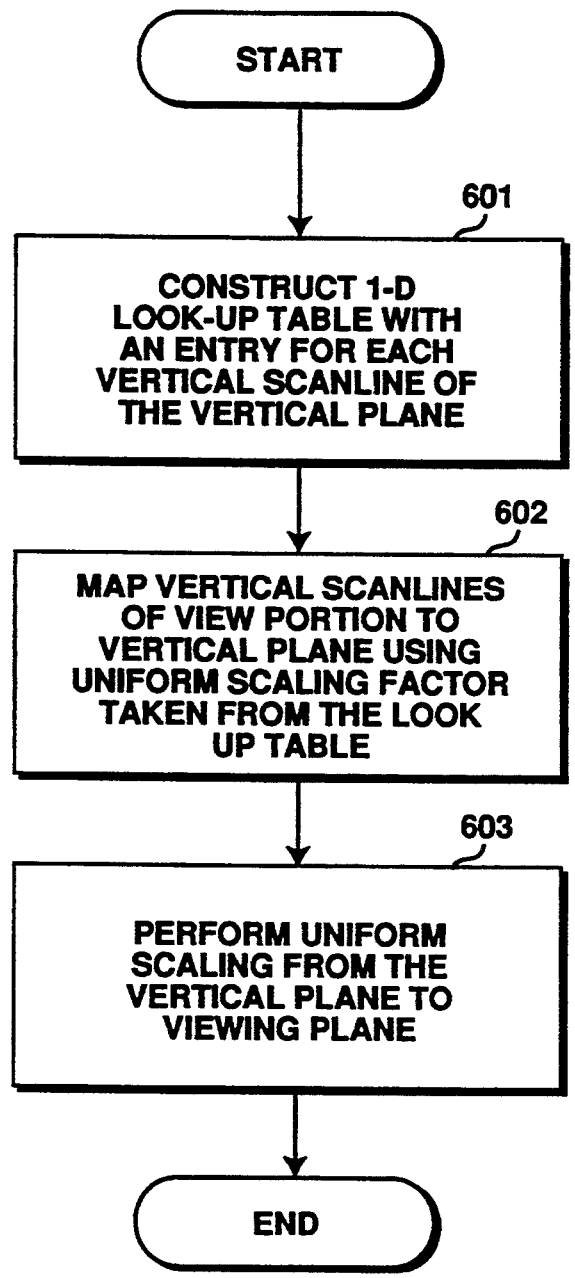
FIG. 6 is a flowchart which describes the steps for vertical rotation as may be performed by the preferred embodiment of the present invention.
Figure 7:
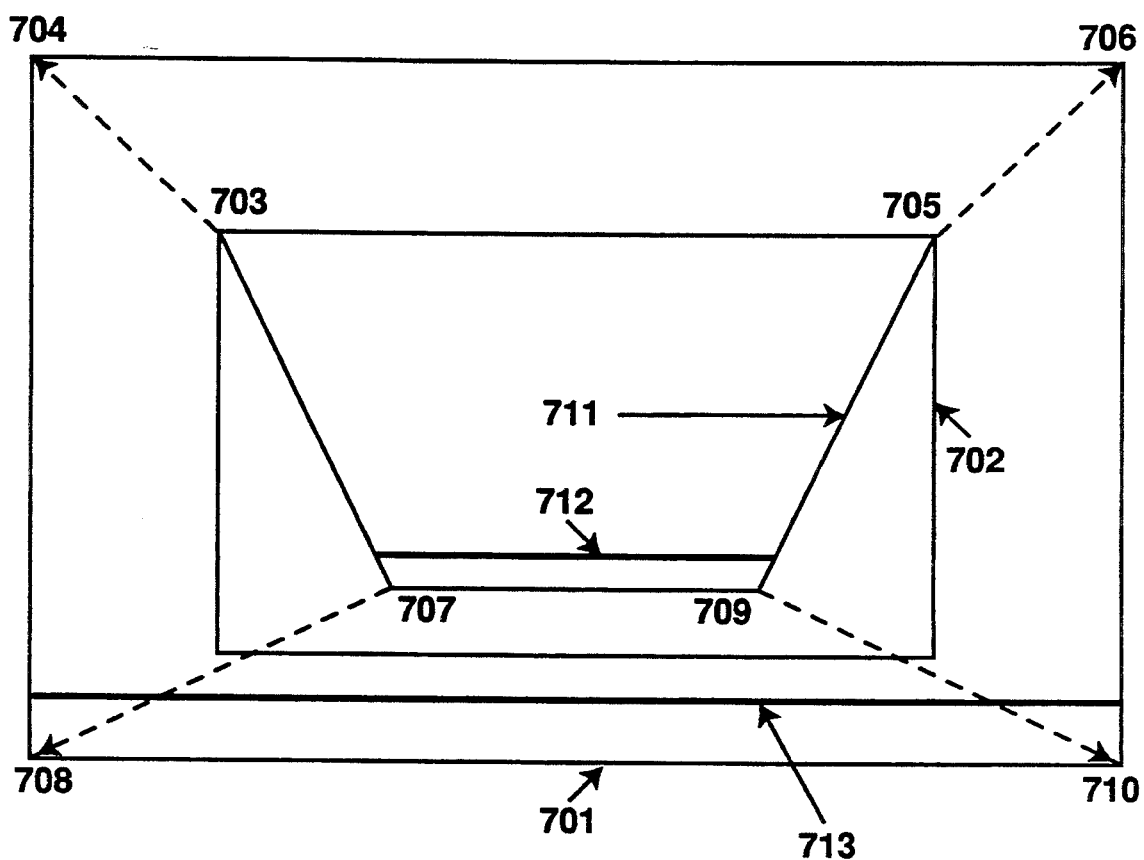
FIG. 7 illustrates horizontal scaling as may be performed by the preferred embodiment of the present invention.

FIGS. 6 and 7 further illustrate vertical rotation and horizontal scaling as performed in the currently preferred embodiment of the present invention. FIG. 6 is a flowchart outlining the steps of vertical rotation. The steps 601–603 are similar to the steps described above with respect to horizontal rotation. In any event, first, a 1-D look-up table is constructed for each vertical scanline of the viewing plane, step 601. As described above, this 1-D look-up table is different than the 1-D look-up table described with reference to horizontal rotation. Here, the v-parameters need to be multiplied by the y-coordinate in order to find the proper scaling factor. Next, each vertical scanline of the viewable portion of the cylindrical environment map is mapped to the viewing plane using the scaling factor, step 602. In the final step 603, horizontal scaling is performed. In the currently preferred embodiment, this involves a uniform scaling of each horizontal scanline from the vertical plane to the viewing plane.

FIG. 7 illustrates horizontal scaling in more detail. A vertical plane 702 is mapped to the viewing plane 701. Each point on a horizontal scanline 712 is mapped to a corresponding point on the scanline 713 of the viewing plane 701. For example, the point 703 of the trapezoid 711 is mapped to point 704 of viewing plane 701. Similarly, points 705, 707 and 709 of the trapezoid 711 are mapped to points 706, 708 and 710 of viewing plane 701.

It should be noted that the viewing plane 701 maps to a trapezoid 711 on the vertical plane 702. The number of horizontal scanlines in the vertical plane 702 is not the same as for viewing plane 701. Thus, horizontal scanlines for the viewing plane 701 will be created using sampling method described above.

Anti-aliasing with the Cylindrical Map

Anti-aliasing is a rendering technique which enhances the quality of an image. Among other things, anti-aliasing is used to eliminate the "stairstep" effect that results when rendering diagonal lines. Using anti-aliasing techniques, a jagged diagonal line may be rendered as a clean line. In the currently preferred embodiment, anti-aliasing is performed during the mapping of the portion of the cylindrical environment map desired, to the viewing plane. So for horizontal rotation, anti-aliasing is performed during the vertical scaling step.

Similarly, for vertical rotation, anti-aliasing is performed during the horizontal scaling step. Known anti-aliasing techniques may also take advantage of the coherent properties of the cylindrical environment map.

Anti-aliasing typically involves filtering adjacent pixels. By filtering what is meant is to avoid abrupt changes in pixel value. The goal is to obtain a smooth transition between colors. Because of the scanline coherency, the pixel values for each vertical scanlines are stored contiguously. Thus, when performing the mapping and anti-aliasing, the needed pixel shading values may be accessed quickly and in sequential order.

The anti-aliasing of the currently preferred embodiment is performed in two steps. In the first step, the source image is resampled to construct or identify a scanline for each of the destination scanlines in the viewing plane. In the second step, each of the source scanlines is again resampled to generate the pixel shading values for the pixels in the destination scanline.

The resampling in the respective steps is performed by interpolating the values from the source scanlines. Interpolation to obtain intermediate values is well known in the art. The interpolation technique chosen would be predicated on considerations of speed and accuracy.

It should be noted that the currently preferred embodiment utilizes two anti-aliasing techniques. This is because rotation of the cylindrical environment may occur interactively. For example, the sense of walking into a room may be created by dynamically changing the scene. Performing anti-aliasing has a measurable effect on the rendering performance. To balance between speed and quality, a progressive refinement approach is used. When rotating the desired view in high speed, the image details are not very noticeable. Therefore, a point sampled version may be used to achieve a high frame rate. The point sampled version does not cause any interpolation to be performed and is a less precise technique for performing anti-aliasing.

Although the interpolation is very efficient, it is slower than the point sampled version. But, when rotating slowly, details are more noticeable. In this case increased quality is desirable, so the anti-aliasing technique described above is used. To compensate for the slower frame rate in the interpolation mode, the frame step size is increased so that the speed remains constant when switching to a different mode. Moreover, when an interactive rotation is terminated, a fully anti-aliased image is generated.

Thus, a method for generating perspective scenes from a cylindrical environment map, is described.

We claim:

1. In a computer controlled display system, a method for displaying perspective corrected portions of an environment map comprising the steps of:
   a) providing a cylindrical environment map, said cylindrical environment map comprised of a plurality of pixel shading values ordered in a first plurality of scanlines;
   b) identifying a first portion of said cylindrical environment map;
   c) mapping said first portion to a viewing plane having a second plurality of pixel shading values ordered in a second plurality of scanlines, said mapping including determining a plurality of scaling factors and applying the scaling factor corresponding to a scanline of said first plurality of scanlines to each pixel shading value in said scanline to obtain said second plurality of pixel shading values, said viewing plane having pre-determined dimensions; and
   d) displaying said viewing plane.

2. The method as recited in claim 1 wherein said step of mapping said first portion to a viewing plane is further comprised of the step of minimizing aliasing effects by:
   interpolating each scanline of said first plurality of scanlines to construct said second plurality of scanlines for said viewing plane; and
   interpolating each scanline of said first plurality of scanlines to define pixel shading values for scanlines of said viewing plane.

3. The method as recited in claim 2 is further comprised of the steps of:
   detecting that a different horizontal view is requested;
   identifying a second portion of said cylindrical environment map;
   mapping said second portion to said viewing plane by scaling pixel shading values of said second portion to said pre-determined dimensions of said viewing plane; and
   displaying said viewing plane.

4. The method as recited in claim 1 wherein said method is further comprised of the steps of:
   determining a view is requested which requires rotation in a vertical direction;
   identifying a second portion of said cylindrical image to be viewed;
   mapping said second portion to a vertical plane by scaling pixel shading values of said second portion to pre-determined dimensions of said vertical plane;
   mapping said vertical plane mapping to a rotated viewing plane; and
   displaying said rotated viewing plane.

5. The method as recited in claim 4 wherein said step of mapping said vertical plane mapping to said rotated viewing plane is further comprised of the step of scaling pixel shading values of said second portion along a horizontal axis.

6. The method as recited in claim 1 wherein said step of displaying said viewing plane is further comprised of the step of mapping said viewing plane to a coordinate system, said coordinate system associated with a viewing device on which said viewing plane will be displayed.

7. In a computer controlled display system, a method for displaying perspective views of a cylindrical environment map, said cylindrical environment map comprised of a plurality of pixel shading values, said method comprising the steps of:
   a) determining a viewpoint from which to view said cylindrical environment map;
   b) identifying a rotation direction;
   c) if said rotation direction is horizontal, performing the steps of:
      identifying a first portion of said cylindrical environment map to be viewed, said first portion having a plurality of vertical scanlines;
      identifying a first viewing plane;
      scaling said first portion vertically to said viewing plane by generating a first plurality of scaling factors and applying the scaling factor corresponding to each of said plurality of vertical scanlines to each of said plurality of vertical scanlines;

mapping said first viewing plane to a coordinate system associated with a viewing device on which said perspective view will be displayed;

d) if said rotation direction is vertical, performing the steps of:

identifying a second portion of said cylindrical environment map to be viewed, said second portion having a plurality of scanlines;

identifying a vertical plane corresponding to said second portion and said vertical rotation;

scaling said second portion vertically to said vertical plane by generating a second plurality of scaling factors and applying the scaling factor corresponding to each of said plurality of scanlines to each of said plurality of scanlines;

identifying a second viewing plane;

scaling said vertical plane horizontally to said second viewing plane;

mapping said second viewing plane to a coordinate system associated with a viewing device on which said perspective view will be displayed.

8. The method as recited in claim 7 wherein said step of scaling said first portion vertically to said viewing plane is comprised of the steps of:

determining a first vertical scaling factor for each vertical scanline of said first portion of said cylindrical environment map;

for each pixel in each vertical scanline of said first portion, applying the corresponding first vertical scaling factor to a pixel shading value for said pixel and inserting in a corresponding pixel location of a corresponding vertical scanline of said first viewing plane.

9. The method as recited in claim 7 wherein said step of generating a first plurality of scaling factors is performed by generating a constant value for each scaling factor of said first plurality of scaling factors based on the relationship of the radius of said cylindrical environment map, the distance from the viewpoint and the first viewing plane.

10. The method as recited in claim 9 wherein said step of scaling said second portion vertically to said vertical plane is comprised of the steps of:

determining a second vertical scaling factor for each vertical scanline of said second portion;

for each pixel in each vertical scanline of said second portion, applying the corresponding second vertical scaling factor to a pixel shading value for said pixel and inserting in a corresponding pixel location of a corresponding vertical scanline of said vertical plane.

11. The method as recited in claim 7 wherein said step of generating a second plurality of scaling factors is performed by generating a constant value for each scaling factor of said second plurality of scaling factors based on the relationship of the radius of said cylindrical environment map, the distance from the viewpoint and the vertical plane and the angular coordinate of said vertical scanline of said vertical plane.

12. The method as recited in claim 11 wherein said step of scaling said vertical plane horizontally to said second viewing plane is comprised of the steps of:

determining a horizontal scaling factor for each horizontal scanline of said vertical plane;

for each pixel in each horizontal scanline of said vertical plane, applying the corresponding horizontal scaling factor to a pixel shading value for said pixel and inserting in a corresponding pixel location of a corresponding horizontal scanline of said vertical plane.

13. The method as recited in claim 12 wherein said step of determining a horizontal scaling factor for each horizontal scanline of said vertical plane is performed by a perspective division between coordinate pixel addresses of said vertical plane and said second viewing plane.

14. A computer controlled display system for generating perspective views of a cylindrical environment map, said system comprising:

a) first storage means for storing said cylindrical environment map;

b) second storage means for storing pixel shading values;

c) a display means for displaying a perspective view, said display means coupled to said second storage means;

d) means for identifying a portion of said cylindrical environment map to be displayed;

e) horizontal scaling means coupled to said means for identifying a portion of said cylindrical environment map to be displayed and said second storage means, said horizontal scaling means for generating pixel shading values on a horizontal scanline by determining a plurality of horizontal scaling factors and applying the scaling factor corresponding to a horizontal scanline of said plurality of horizontal scanlines to each pixel shading value in said horizontal scanline; and f) vertical scaling means coupled to said means for identifying a portion of said cylindrical environment map to be displayed and said second storage means, said vertical scaling means for generating pixel shading values on a vertical scanline by determining a plurality of vertical scaling factors and applying the scaling factor corresponding to a vertical scanline of said plurality of vertical scanlines to each pixel shading value in said vertical scanline.

15. The computer controlled display system as recited in claim 14 wherein said horizontal scaling means is further comprised of:

means for generating a uniform horizontal scaling factor for each horizontal scanline; and means for applying said uniform horizontal scaling factor to pixel shading values of horizontal scanlines from a portion of said cylindrical environment map and storing in said second storage means.

16. The computer controlled display system as recited in claim 14 wherein said vertical scaling means is further comprised of:

means for generating a uniform vertical scaling factor for each vertical scanline; and means for applying said uniform vertical scaling factor to pixel shading values of vertical scanlines from a portion of said cylindrical environment map and storing in said second storage means.

17. The computer controlled display system as recited in claim 14 is further comprised of a means for generating anti-aliased pixel values coupled to said horizontal scaling means and said vertical scaling means.

* * * * *